(12) United States Patent
Kavantzas et al.

(10) Patent No.: US 8,973,117 B2
(45) Date of Patent: Mar. 3, 2015

(54) PROPAGATING SECURITY IDENTITY INFORMATION TO COMPONENTS OF A COMPOSITE APPLICATION

(71) Applicant: Oracle International Corporation, Redwood Shores, CA (US)

(72) Inventors: Nickolas Kavantzas, Emerald Hills, CA (US); Prakash Yamuna, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/106,037

(22) Filed: Dec. 13, 2013

(65) Prior Publication Data

US 2014/0109195 A1   Apr. 17, 2014

Related U.S. Application Data

(63) Continuation of application No. 13/149,049, filed on May 31, 2011, now Pat. No. 8,635,682.

(60) Provisional application No. 61/417,175, filed on Nov. 24, 2010.

(51) Int. Cl.
*H04L 29/00* (2006.01)
*H04L 29/06* (2006.01)
*G06F 9/46* (2006.01)
*G06F 21/44* (2013.01)

(52) U.S. Cl.
CPC ............... *H04L 63/08* (2013.01); *G06F 9/461* (2013.01); *G06F 21/44* (2013.01)
USPC .................. 726/6; 726/4; 726/9; 715/803

(58) Field of Classification Search
CPC ............................. H04L 29/06; G06F 21/00
USPC .......................................... 726/4, 9; 715/803
See application file for complete search history.

(56) References Cited

U.S. PATENT DOCUMENTS 5,797,128 A   8/1998   Birnbaum
5,889,953 A   3/1999   Thebaut et al.

(Continued)

OTHER PUBLICATIONS

U.S. Appl. No. 13/118,876, Notice of Allowance mailed on Jun. 12, 2013, 9 pages.

(Continued)

*Primary Examiner* — Brandon Hoffman
*Assistant Examiner* — Michael D Anderson
(74) *Attorney, Agent, or Firm* — Kilpatrick Townsend & Stockton LLP

(57) ABSTRACT

Various methods and systems for propagating identity information in a composite application are presented. State data of a composite application, as executed for a particular entity, may be transferred to and stored by a computer-readable storage medium. The state data may include a portion of a set of subject information linked with the entity. A security attribute of the subject may not be present in the portion of the set of subject information in the state data transferred to the non-transitory computer-readable storage medium. After a period of time, such as an hour or a day, the state data of the composite application as executed for the entity may be retrieved and the security attribute of the set of subject information linked with the entity may be determined The composite application may then continue to be executed for the entity.

18 Claims, 6 Drawing Sheets

(56) References Cited

U.S. PATENT DOCUMENTS

| | | | |
|---|---|---|---|
| 6,064,656 A | 5/2000 | Angal et al. |
| 6,167,445 A | 12/2000 | Gai et al. |
| 6,516,416 B2 | 2/2003 | Gregg et al. |
| 6,578,076 B1 | 6/2003 | Putzolu |
| 6,944,183 B1 | 9/2005 | Iyer et al. |
| 6,952,728 B1 | 10/2005 | Alles et al. |
| 7,197,741 B1 | 3/2007 | Stapf |
| 7,213,068 B1 | 5/2007 | Kohli et al. |
| 7,290,288 B2 | 10/2007 | Gregg et al. |
| 7,350,204 B2 | 3/2008 | Lambert et al. |
| 7,424,702 B1 | 9/2008 | Vinodkrishnan et al. |
| 7,444,643 B2 | 10/2008 | Lo et al. |
| 7,478,419 B2 | 1/2009 | Anderson et al. |
| 7,543,276 B2 | 6/2009 | Pfander et al. |
| 7,725,605 B2 | 5/2010 | Palmeri et al. |
| 7,796,760 B2 | 9/2010 | Brettle et al. |
| 7,855,972 B2 | 12/2010 | Pettit et al. |
| 7,877,264 B2 | 1/2011 | Fox et al. |
| 8,005,930 B2 | 8/2011 | Abeln et al. |
| 8,104,080 B2 | 1/2012 | Burns et al. |
| 8,156,538 B2 | 4/2012 | Kanade et al. |
| 8,265,969 B2 | 9/2012 | Comstock et al. |
| 8,307,413 B2 * | 11/2012 | Smadja et al. .................. 726/9 |
| 8,560,819 B2 | 10/2013 | Fillipi et al. |
| 8,635,682 B2 | 1/2014 | Kavantzas et al. |
| 8,650,250 B2 | 2/2014 | Yamuna et al. |
| 8,650,288 B2 | 2/2014 | Yamuna et al. |
| 8,726,349 B2 | 5/2014 | Kavantzas et al. |
| 2002/0124067 A1 | 9/2002 | Parupudi et al. |
| 2003/0115179 A1 | 6/2003 | Prabakaran et al. |
| 2003/0115484 A1 | 6/2003 | Moriconi et al. |
| 2003/0229501 A1 | 12/2003 | Copeland et al. |
| 2004/0039594 A1 | 2/2004 | Narasimhan et al. |
| 2004/0103046 A1 | 5/2004 | Christoph et al. |
| 2004/0189708 A1 | 9/2004 | Larcheveque et al. |
| 2005/0080914 A1 | 4/2005 | Lerner et al. |
| 2005/0086197 A1 | 4/2005 | Boubez et al. |
| 2005/0091352 A1 | 4/2005 | Alex et al. |
| 2005/0223109 A1 | 10/2005 | Mamou et al. |
| 2006/0041565 A1 | 2/2006 | Cuomo et al. |
| 2006/0053120 A1 | 3/2006 | Shum et al. |
| 2006/0075465 A1 | 4/2006 | Ramanathan et al. |
| 2006/0088276 A1 | 4/2006 | Cho et al. |
| 2006/0089938 A1 | 4/2006 | Leonard et al. |
| 2006/0206440 A1 | 9/2006 | Anderson et al. |
| 2006/0230430 A1 | 10/2006 | Hondo et al. |
| 2007/0006278 A1 | 1/2007 | Ioan Avram et al. |
| 2007/0157287 A1 | 7/2007 | Lim |
| 2007/0266032 A1 | 11/2007 | Blumenau |
| 2007/0266422 A1 | 11/2007 | Germano et al. |
| 2007/0282879 A1 | 12/2007 | Degenkolb et al. |
| 2008/0046961 A1 | 2/2008 | Pouliot |
| 2008/0066189 A1 | 3/2008 | Liu et al. |
| 2008/0071805 A1 | 3/2008 | Mourra et al. |
| 2008/0091682 A1 | 4/2008 | Lim |
| 2008/0148345 A1 | 6/2008 | Rubio |
| 2008/0155641 A1 | 6/2008 | Beavin et al. |
| 2008/0184201 A1 | 7/2008 | Burns et al. |
| 2008/0189760 A1 | 8/2008 | Rosenberg et al. |
| 2008/0225748 A1 | 9/2008 | Khemani et al. |
| 2008/0244692 A1 | 10/2008 | Chang |
| 2008/0244693 A1 | 10/2008 | Chang |
| 2008/0256593 A1 | 10/2008 | Vinberg et al. |
| 2008/0288651 A1 | 11/2008 | Brauel et al. |
| 2008/0301757 A1 | 12/2008 | Demarest et al. |
| 2009/0070853 A1 | 3/2009 | Chung et al. |
| 2009/0099860 A1 | 4/2009 | Karabulut et al. |
| 2009/0099882 A1 | 4/2009 | Karabulut |
| 2009/0125612 A1 | 5/2009 | Rabetge et al. |
| 2009/0150824 A1 * | 6/2009 | Furuichi .................. 715/803 |
| 2009/0177929 A1 | 7/2009 | Sijelmassi |
| 2009/0193057 A1 | 7/2009 | Maes |
| 2009/0205013 A1 | 8/2009 | Lowes |
| 2009/0281996 A1 | 11/2009 | Liu et al. |
| 2010/0030890 A1 | 2/2010 | Dutta et al. |
| 2010/0064184 A1 | 3/2010 | Almeida et al. |
| 2010/0077455 A1 | 3/2010 | Nishio et al. |
| 2010/0100810 A1 | 4/2010 | Nakamura et al. |
| 2010/0115075 A1 | 5/2010 | Chen et al. |
| 2010/0125477 A1 | 5/2010 | Mousseau et al. |
| 2010/0125665 A1 | 5/2010 | Simpson et al. |
| 2010/0153695 A1 | 6/2010 | Bussard et al. |
| 2010/0235915 A1 | 9/2010 | Memon et al. |
| 2010/0269148 A1 | 10/2010 | Almeida et al. |
| 2010/0281455 A1 | 11/2010 | Anand et al. |
| 2010/0281516 A1 | 11/2010 | Lerner et al. |
| 2011/0035650 A1 | 2/2011 | Jardine-Skinner et al. |
| 2011/0047451 A1 | 2/2011 | Jardine-Skinner et al. |
| 2011/0131275 A1 | 6/2011 | Maida-Smith et al. |
| 2011/0302239 A1 | 12/2011 | Grateau et al. |
| 2011/0321122 A1 | 12/2011 | Mwangi et al. |
| 2012/0054496 A1 | 3/2012 | Abeln et al. |
| 2012/0102182 A1 | 4/2012 | Voskuil et al. |
| 2012/0110093 A1 | 5/2012 | Tingstrom et al. |
| 2012/0131091 A1 | 5/2012 | Yamuna et al. |
| 2012/0131135 A1 | 5/2012 | Yamuna et al. |
| 2012/0131164 A1 | 5/2012 | Bryan et al. |
| 2012/0131469 A1 | 5/2012 | Yamuna et al. |
| 2012/0131641 A1 | 5/2012 | Kavantzas et al. |
| 2012/0131654 A1 | 5/2012 | Kavantzas et al. |
| 2012/0216100 A1 | 8/2012 | Jardine-Skinner et al. |
| 2012/0311309 A1 | 12/2012 | Fillipi et al. |
| 2013/0086184 A1 | 4/2013 | Kavantzas et al. |
| 2013/0086240 A1 | 4/2013 | Bryan et al. |
| 2013/0086241 A1 | 4/2013 | Bryan et al. |
| 2013/0086242 A1 | 4/2013 | Bryan et al. |
| 2013/0086626 A1 | 4/2013 | Kavantzas et al. |
| 2013/0086627 A1 | 4/2013 | Bryan et al. |
| 2013/0262646 A1 | 10/2013 | Fiebig et al. |
| 2014/0013092 A1 | 1/2014 | Fillipi et al. |
| 2014/0129706 A1 | 5/2014 | Yamuna et al. |

OTHER PUBLICATIONS

U.S. Appl. No. 13/118,940, Final Office Action mailed on Aug. 29, 2013, 10 pages.

U.S. Appl. No. 13/118,940, Non-Final Office Action mailed on Feb. 13, 2013, 9 pages.

U.S. Appl. No. 13/118,940, Notice of Allowance mailed on Jan. 15, 2014, 5 pages.

U.S. Appl. No. 13/118,944, Corrected Notice of Allowance mailed on Dec. 16, 2013, 5 pages.

U.S. Appl. No. 13/118,944, Non Final Office Action mailed on May 16, 2013, 31 pages.

U.S. Appl. No. 13/118,944, Notice of Allowance mailed on Oct. 10, 2013, 10 pages.

U.S. Appl. No. 13/149,037, Non-Final Office Action mailed on May 1, 2013, 9 pages.

U.S. Appl. No. 13/149,037, Notice of Allowance mailed on Oct. 8, 2013, 7 pages.

U.S. Appl. No. 13/149,049, Non-Final Office Action mailed on Mar. 5, 2013, 15 pages.

U.S. Appl. No. 13/149,049, Notice of Allowance mailed on Sep. 17, 2013, 10 pages.

U.S. Appl. No. 13/149,065, Final Office Action mailed on Jul. 3, 2013, 21 pages.

U.S. Appl. No. 13/149,065, Non-Final Office Action mailed on Dec. 4, 2012, 30 pages.

U.S. Appl. No. 13/436,933, Non-Final Office Action mailed on Feb. 20, 2014, 25 pages.

U.S. Appl. No. 13/436,940, Final Office Action mailed on Jan. 28, 2014, 22 pages.

U.S. Appl. No. 13/436,940, Non-Final Office Action mailed on Jul. 15, 2013, 31 pages.

U.S. Appl. No. 13/596,861, Non-Final Office Action mailed on Apr. 10, 2014, 29 pages.

U.S. Appl. No. 14/026,767, Non-Final Office Action mailed on Mar. 4, 2014, 7 pages.

Bajaj et al., Web Services Policy Framework (WS-Policy), BEA systems Inc. et al. version 1.2, Mar. 2006, 29 pages.

(56) References Cited

OTHER PUBLICATIONS

Christensen et al., Web Services Description Language (WSDL), World Wide Web Consortium. version 1.1, Mar. 2001, 29 pages.

Nordbotten, XML and Web Services Security Standards, Communications Surveys & Tutorials, IEEE, vol. 11, No. 3, Oct. 3, 2009, pp. 4-21.

Phan et al., Quality-Driven Business Policy Specification and Refinement for Service-Oriented Systems, Springer-Verlag Berlin Heidelberg, 2008, pp. 5-21.

Shute et al., DataPower SOA Appliance Service Planning, Implementation, and Best Practices, IBM Redbook, Jun. 28, 2011, 160 pages.

U.S. Appl. No. 13/118,947, Non-Final Office Action mailed on Jun. 20, 2014, 31 pages.

U.S. Appl. No. 13/436,940, Advisory Action mailed on Apr. 22, 2014, 3 pages.

U.S. Appl. No. 13/596,525, Non Final Office Action mailed on May 30, 2014, 15 pages.

U.S. Appl. No. 13/596,891, Non-Final Office Action mailed on Apr. 25, 2014, 10 pages.

U.S. Appl. No. 13/149,065, Non-Final Office Action mailed on Jul. 14, 2014, 23 pages.

U.S. Appl. No. 13/436,933, Final Office Action mailed on Aug. 29, 2014, 28 pages.

U.S. Appl. No. 13/436,940, Notice of Allowance mailed on Aug. 12, 2014, 13 pages.

U.S. Appl. No. 13/596,545, Non-Final Office Action mailed on Aug. 4, 2014, 27 pages.

U.S. Appl. No. 13/596,861, Final Office Action mailed on Oct. 3, 2014, 30 pages.

U.S. Appl. No. 13/596,891, Final Office Action mailed on Oct. 2, 2014, 11 pages.

U.S. Appl. No. 14/026,767, Notice of Allowance mailed on Sep. 8, 2014, 9 pages.

\* cited by examiner

PROPAGATING SECURITY IDENTITY INFORMATION TO COMPONENTS OF A COMPOSITE APPLICATION

CROSS-REFERENCES TO RELATED APPLICATIONS

This application is a continuation of U.S. patent application Ser. No. 13/149,049 filed May 31, 2011, titled "PROPAGATING SECURITY IDENTITY INFORMATION TO COMPONENTS OF A COMPOSITE APPLICATION," which claims priority from co-pending U.S. Provisional Patent Application No. 61/417,175, filed Nov. 24, 2010, entitled "Propagating Security Identity Information Between Components of a Process Oriented Composite Application in the Presence of Application Restarts," which is hereby incorporated by reference, as if set forth in full in this document, for all purposes.

This application is also related to following, U.S. Patent Applications, each of which is hereby incorporated by reference, as if set forth in full in this document, for all purposes: (1) U.S. application Ser. No. 13/149,037, entitled "Identifying Compatible Web Service Policies;" (2) U.S. application Ser. No. 13/118,940, entitled "Optimizing Interactions Between Co-Located Processes;" (3) U.S. application Ser. No. 13/149,065, entitled "Nonconforming Web Service Policy Functions;" (4) U.S. application Ser. No. 13/118,944, entitled "Runtime Usage Analysis For A Distributed Policy Enforcement System;" and (5) U.S. application Ser. No. 13/118,947, entitled "Attaching Web Service Policies To A Group Of Policy Subjects," all of which were filed on May 31, 2011.

BACKGROUND

Web services that an entity, such as a user, may interact with can be executed over a lengthy period of time. For example, a web service that obtains a loan approval for the user may take days, or even weeks, to complete from start to finish. As such, while the web service is being executed for the entity, substantial periods of inactivity may be present where no processing is being performed related to the entity, such as while waiting for a bank to respond to a query as to whether it is willing to grant a loan. While the web service is being executed for the user, many, perhaps thousands, of other users may also be interacting with the web service.

While the web service is being executed over a lengthy period of time, interruptions may occur, such as restarts to the computer system hosting the web service. Further, system resources may need to be preserved due to the large number of other entities using the web service. As such, maintaining a processing thread for an entity during a period of inactivity may not be efficient.

SUMMARY

In some embodiments, a method for propagating identity information in a composite application is presented. The method may include processing, by a computer system, a first step of the composite application for an entity. The entity may be linked with a set of subject information. The set of subject information may comprise an identity attribute linked with the entity and a security attribute linked with the entity. The first step may be processed if the security attribute is authenticated. The method may include transferring, by the computer system, state data of the composite application as executed for the entity to a non-transitory computer-readable storage medium. The state data may comprise at least a portion of the set of subject information linked with the entity. The security attribute of the subject may not be present in at least the portion of the set of subject information in the state data transferred to the non-transitory computer-readable storage medium. The method may include storing, by the computer system, the state data of the composite application as executed for the entity using the non-transitory computer-readable storage medium. The method may include retrieving, by the computer system, the state data of the composite application as executed for the entity from the non-transitory computer-readable storage medium. The method may include, following retrieving the state data of the composite application as executed for the entity, determining, by the computer system, the security attribute of the set of subject information linked with the entity. The method may include populating, by the computer system, the security attribute of the set of subject information linked with the entity.

In some embodiments, a restart is tolerated while the state data of the composite application as executed for the entity is stored by the non-transitory computer-readable storage medium. In some embodiments, following the transfer of the state data of the composite application as executed for the entity to the non-transitory computer-readable storage medium, but before retrieving the state data of the composite application from the computer-readable storage medium, a period of time elapses, wherein the period of time is selected from a group consisting of: at least an hour; at least a day; and at least a week. In some embodiments, the method may include, following populating the security attribute of the set of subject information linked with the entity, processing a second step of the composite application for the entity. The second step may be processed if the security attribute is authenticated. In some embodiments, the method includes, following populating the security attribute of the set of subject information linked with the entity, aborting the composite application for the entity, wherein the security attribute is not authenticated. In some embodiments, the method includes, following transferring the state data of the composite application as executed for the entity to the non-transitory computer-readable storage medium, ending, by the computer system, a first processing string linked with the entity, wherein processing the second step utilizes a second processing string. In some embodiments, storing, by the computer system, the state data of the composite application as executed for the entity using the non-transitory computer-readable storage medium comprises storing the state data as a data blob within a database on the non-transitory computer-readable storage medium.

In some embodiments, a computer program product residing on a non-transitory processor-readable medium and comprising processor-readable instructions is presented. The instructions may be configured to cause a processor to process a first step of a composite application for an entity. The entity may be linked with a set of subject information. The set of subject information may comprise an identity attribute linked to the entity and a security attribute. The first step may be processed if the security attribute is authenticated. The instructions may be configured to cause a processor to transfer state data of the composite application as executed for the entity to a non-transitory computer-readable storage medium. The state data may comprise a portion of the set of subject information linked with the entity. The security attribute of the subject may not be stored by the non-transitory computer-readable storage medium. The instructions may be configured to cause a processor to cause the state data of the composite application as executed for the entity to be stored using the non-transitory computer-readable storage medium. The instructions may be configured to cause a processor to cause the state data of the composite application as executed for the entity to be retrieved from the non-transitory computer-readable storage medium. The instructions may be configured to cause a processor to following the state data of the composite application being retrieved, determine the security attribute of the set of subject information linked with the entity. The instructions may be configured to cause a processor to populate the security attribute of the set of subject information linked with the entity.

In some embodiments, a system for propagating identity information in a composite application. The system may include a processor, wherein the processor may be configured to process a first step of a composite application for an entity. The entity may be linked with a set of subject information. The set of subject information may comprise an identity attribute linked to the entity and a security attribute. The first step may be processed if the security attribute is authenticated. The processor may be configured to process transfer state data of the composite application as executed for the entity to a non-transitory computer-readable storage medium. The state data may comprise a portion of the set of subject information linked with the entity. The security attribute of the subject may not be stored by the non-transitory computer-readable storage medium. The processor may be configured to retrieve the state data of the composite application as executed for the entity from the non-transitory computer-readable storage medium. The processor may be configured to, following retrieving the state data of the composite application, determine the security attribute of the set of subject information linked with the entity. The processor may be configured to populate the security attribute of the set of subject information linked with the entity. The system may include the non-transitory computer-readable storage medium which is configured to store the state data of the composite application as executed for the entity.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
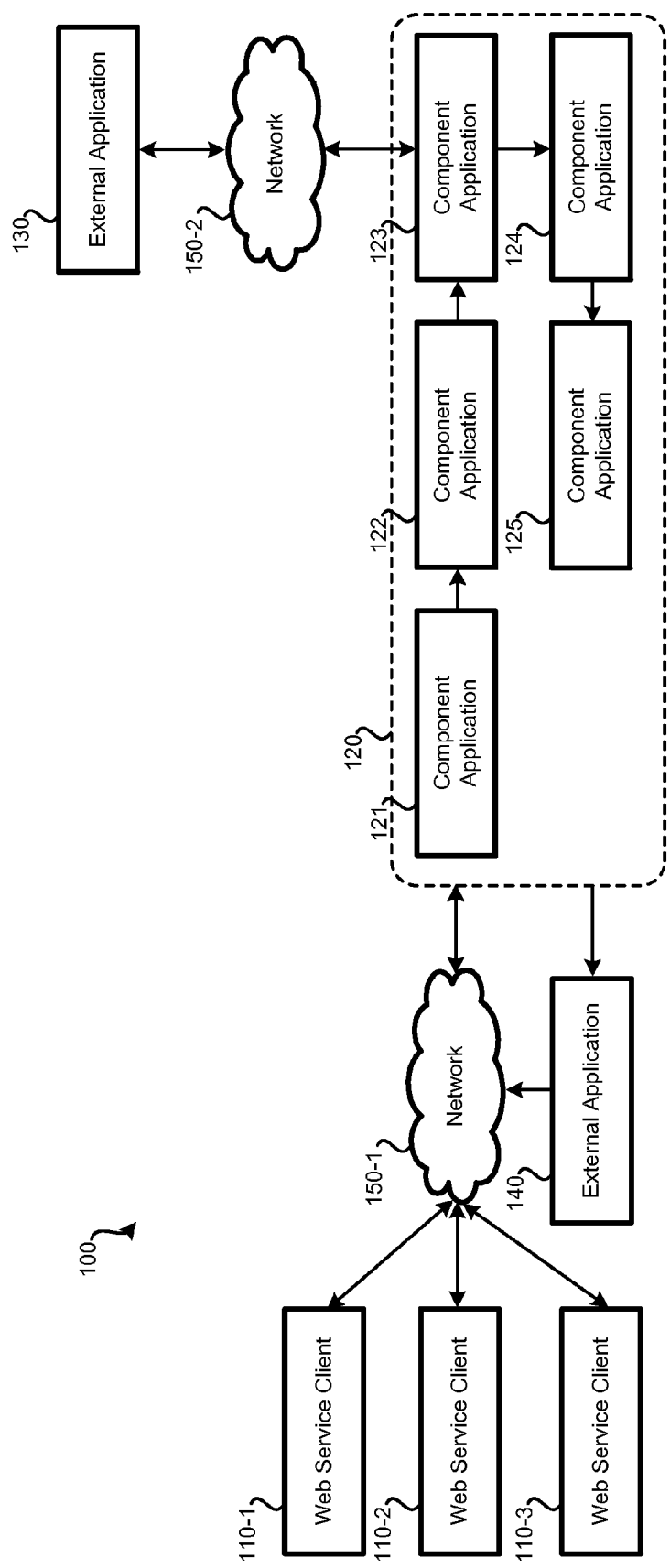
FIG. 1 illustrates an embodiment of a system that includes a composite application.

The present invention, in general, relates to composite applications and, in particular, to maintaining security identity information of an entity while processing components of a composite application, even in the presence of application and/or system restarts.

A composite application, such as a process-oriented composite application that can serve as a web service to other entities, such as a web service client, may process threads for many different entities simultaneously or near-simultaneously. A process-oriented composite application may combine various component applications to perform a process. Each component application may perform one or more particular functions, with the output of one component application serving as an input to another component application. Such an arrangement may allow for a designer to program in a declarative nature. That is, the designer may be allowed to specify what outputs the composite application should accomplish by linking together various component applications, but not how the outputs should be generated at the code level.

A composite application may serve as a web service for a large number of entities. By way of example only, a composite application may provide a web service to thousands of web service clients. Further, for each of these web service clients, the composite application may require a significant amount of time to execute from start to finish. For example, a composite application may take on the order of several hours, one or more days, or a week or more to execute from start to finish for a particular entity. During such an extended period of time, there may be significant stretches of time where nothing needs to be actively processed for the particular entity. For example, if the composite application is waiting for an input from an external source, such as a financial approval message from a bank, the composite application may not process anything for that entity until a response is received from the bank.

As such, during this period of time when nothing is being processed related to the entity, it may not be efficient, secure, and/or practical to maintain all of the data related to the execution of the composite application for the entity in memory local to the computer(s) performing the composite application. For example, for each web service client, a processing thread may need to be maintained. Within this processing thread, security identity information that links the processing thread with the web service client may be present.

Rather than maintain this processing thread, which consumes computing resources, such as processor time and memory, state data of the composite application, as performed for the web service client, along with security identity information of the web service client, may be captured. Following this state data and security identity information being captured, the processing thread may be reallocated to some other web service client. This state data may be stored in a database along with the security identity data linked with the web service client. The security identity information may be of the JAVA identity class. An instantiation of this identity class, an identity object, may be used to identify the web service client and various security attributes linked with the web service client.

Due to the possible long period of time to execute the composite application from start to finish for a particular web service client or other entity, the security attributes associated with the entity may be reevaluated following retrieval of the state data and the identity information from the database. This reevaluation of security attributes allows for authentication of whether the processing of the composite application linked with web service client should be permitted to continue. For example, prior to the reevaluation of the security attributes, the entity's right to access all or portions of the composite application may be revoked (such as, by an administrator). Therefore, the reevaluation of the security attributes may result in the web service client no longer being authenticated to execute the composite application. As such, the composite application may cease to be executed for the web service client. If the reevaluation had not occurred, the web service client may have continued to access the composite application because the security attributes were previously established when the web service client had proper security credentials.

Further, because the security attributes of the entity are re-evaluated when the data linked to the entity is retrieved from the database, the values of the security attributes linked with the entity may not need to be stored in the database. As such, less information may need to be stored in the database.

Following the security attributes being revaluated for the web service client and execution of the composite application being continued, a processing thread, different from the processing thread before the state data was stored in database, may be used to continue processing the composite application for the web service client. Using the state data, the processing thread may continue from where execution of the composite application was halted when the state data was transferred to the database.

FIG. 1 illustrates an embodiment of a system 100 that includes a composite application 120. System 100 includes: web service clients 110, composite application 120, external applications 130 and 140, and networks 150. Web service clients 110 may be entities that request a web service from composite application 120. Web service clients 110 may be operated by users. Web service clients 110 may communicate with composite application 120 via network 150-1. While system 100 is illustrated as having three web service clients (110-1, 110-2, and 110-3), more or fewer web service clients may be present. For example, composite application 120 may be executed for one web service client, or tens, hundreds, or thousands of web service clients.

Network 150-1 may represent one or more public and/or private networks. Network 150 may represent the Internet. As such, network 150-1 may allow web service clients 110 to communicate with composite application 120. In some embodiments, one or more of web service clients 110 may communicate with composite application 120 without using network 150-1.

Composite application 120 may represent a process-oriented composite application. A process-oriented composite application may include various component applications (in system 100, component applications 121, 122, 123, 124, and 125 are present) to perform a process and provide an output or result to some external application or to a web service client. Each component application may perform one or more particular functions, with the output of one component application serving as an input to one or more other component applications. Such an arrangement may allow for a designer to program in a declarative nature, that is, allowing the designer to specify what outputs the composite application should accomplish, but not how it should accomplish generating those outputs on the code level. For example, for a designer to create a composite application, the designer may use a graphical user interface to interconnect a series of component application in a desired order. The resulting composite application may then use this combination and order of component applications to provide an output.

A process-oriented composite application may process threads for many different web service clients simultaneously or near-simultaneously. For example, component application 122 may be being executed in relation to web service client 110-1, while component application 124 is being executed in relation to web service client 110-2. Further, a single component application may be executed on behalf of multiple web service clients. For example, component application 123 may be executed in relation to web service client 110-1 and web service client 110-3 at the same time. In practice, if a composite application is serving as a web service for a large number of web service clients, each component application may be processing threads linked with tens or hundreds of web service clients at the same time.

The processing of a request received from a web service client of web service clients 110 by composite application 120 may be performed by component applications in a set order. When a request is received by composite application 120 from a web service of web service clients 110, component application 121 may initially process the request. After component application 121 has performed one or more functions, component application 121 may transmit data to component application 122. Component application 122 may perform predefined functions different from the functions performed by component application 121.

Following processing the data received from component application 121, component application 122 may forward data to component application 123. Component application 123 may interact with an external application, such as external application 130. External application 130 may be operated on behalf of the same entity or a different entity from the entity that operates composite application 120. For example, external application 130 may be operated by a financial institution, another company, a different department, etc. For component application 123 to proceed, it may submit a request to external application 130 via network 150-2. Component application 123 may wait until a response is received from external application 130 before any further processing of the thread. The timing of the response from external application 130 may be based on the nature of the request. For example, a database lookup by external application 130 may take a short period of time, such as less than a second. However, an approval for a loan that is to be processed by external application 130, which may require an employee of the financial institution to manually review information, may take multiple days.

Once a response is received, component application 123 may continue to process the data related to the corresponding web service client. Once component application 123 has completed its function, data may be passed to component application 124. As an example, component application 124 may require additional information to be provided by the corresponding web service client. A request may be sent to the appropriate web service client. Again, processing of a composite application in relation to the web service client may halt until a response is received, possibly for a short period of time, such as 300 milliseconds, or possibly multiple days or even weeks. Once component application 124 has completed processing data related to the request received from the web service client, component 125 may be processed.

The order of processing component application 121, followed, in order, by component application 122, component application 123, component application 124, and component application 125 may be set, as determined by the designer of composite application 120. As such, every initial request received from a web service client may be handled in the same manner: processed, in order, by component applications 121 through 125.

Following component application 125 processing the data related to the web service client passed by component application 124, a final output may be routed to an external application, such as external application 140, or may be routed back to the web service client that initiated the processing of composite application 120. If routed to external application 140, external application 140 may perform some level of processing on the data received from component application 125. External application may then route a result to the appropriate web service of web service clients 110 via network 150-1. Alternatively, some other application or web service client may receive the output of composite application 120.

The process of performing the web service for a web service client may take a short period of time, such as less than a second, or may take many hours or days to complete. If a large number of web service clients are using the web service provided by composite application 120 and the composite application takes a long period of time to execute from start to finish, the composite application may be responsible for maintaining a large amount of data related to the various threads being processed for web service clients 110. If periods of inactivity exist during the processing of composite application 120 for particular web service clients, the associated processing threads may represent a waste of processing and memory resources. As such, it may not be efficient to maintain data linked with the web service client in memory local to composite application 120, especially if composite application 120 is handling requests from many web clients at once and does not have excess memory to spare. Similarly, it may not be efficient to maintain processing threads linked with the web service client if nothing related to the web service client currently requires active processing.

Further, it is not assumed that every web service client that is initially authorized to access composite application 120 remains authorized. For example, a web service client utilizing the web service provided by composite application 120 may cease to meet the security requirements necessary to access composite application 120 while composite application 120 is being executed in relation to the web service client.

Initially, the security attributes of each web service client attempting to use composite application 120 may be evaluated before component application 121 begins processing the request from the web service client. However, if composite application 120 takes a lengthy period of time to complete from start to finish for executing a request from a particular web service client, the security attributes of that web service client may change between the initiation of processing composite application 120 and later steps performed by composite application 120. As such, reevaluation of security permissions can be performed at various stages of the processing of composite applications, such as whenever a new thread is started for processing data related to the web service client.

While composite application 120 contains five component applications, and only one external application (external application 130) is illustrated as interacting with a component application, it should be understood that composite application 120 is an example only and is not intended to be limiting in how the component applications of a composite application may interact with each other or with external applications.

Figure 2:
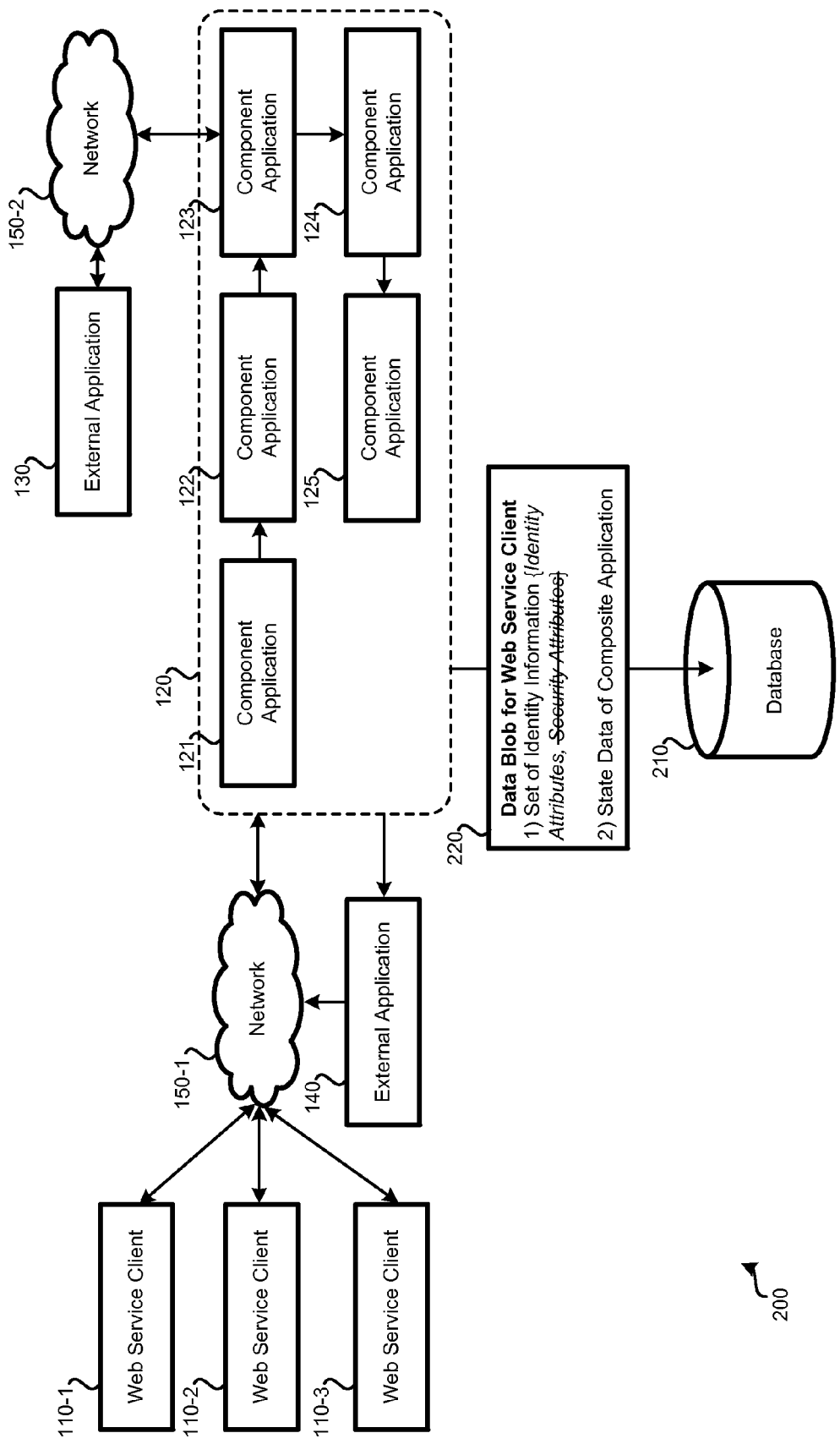
FIG. 2 illustrates an embodiment of a system that includes a composite application hydrating a database with data linked with a web service client

FIG. 2 illustrates an embodiment of a system 200 that includes a composite application hydrating a database with a data linked with a web service client. System 200 may represent system 100 of FIG. 1. In system 200, at various "checkpoints," composite application 120 may transfer some or all state data related to the processing of composite application 120 for a particular web service client to database 210. The processing thread related to this web service client may then be reallocated to another web service client. At a later time, the state data may be reloaded by composite application 120 such that processing of the composite application for the web service client can resume using a different processing thread while maintaining a link between the state data and the web service client and verifying the security attributes of the web service client.

A checkpoint, that may trigger composite application 120 to transfer state data to database 210, may be implemented on a computer-readable storage medium. A checkpoint may include situations such as: 1) whenever the component application processing the request linked with the web service client changes; 2) whenever a significant amount of time to process a particular component application is detected or expected, such as based on previously observed time periods; 3) whenever a developer has indicated that a checkpoint should occur; 4) on a time-based schedule, such as once per hour or day; 5) before a restart of a component application, the entire composite application; and/or the computer system(s) running composite application 120 occurs. As will be understood by those with skill in the art, checkpoints may also be triggered by other events.

As a more concrete example, consider the situation of component application 123 interacting with external application 130. If external application 130 is operated by a bank to process loan applications, it may be several days after receiving a request from component application 123 that external application 130 responds to the request. As such, during this period of time, no processing related to the web service client may be performed by composite application 120. As such, a checkpoint may be established at component application 123 such that while component application 123 is waiting for a response from external application 130, data related to the processing of composite application 120 in relation to the web service client 110-1 is temporarily stored in database 210 and the associated processing thread is no longer allocated to web service client 110-1.

When a checkpoint is reached, state data related to the execution of composite application 120, as processed for a particular web service client, such as web service client 110-1, may be captured. Along with this state data, a set of security identity information may be captured. This set of security identity information may be used to link the state data with web service client 110-1. The set of security identity information may be a JAVA object instantiation of the standard JAVA subject class. A JAVA subject object may represent a group of related security information for a single entity, such as a person or web service client. Such information may include one or more identities of the entity. Additionally, security attributes of an entity may be included in the JAVA subject object. These security attributes may include the user name and potentially received security claims identifying the authenticated user. JAVA subject objects may typically be linked with a processing thread. If the processing thread is terminated, the subject information may be lost.

The state data related to the execution of the composite application as processed for a particular web service client may be linked with the set of security identity information and stored in database 210. The state data, along with the set of security identity information, may be stored in the form of a data blob 220 in database 210. A data blob may refer to a binary entry in a database that is unstructured and has an arbitrary size. As such, data blob 220 may be larger or smaller than other data blobs stored in database 210.

Prior to storing data blob 220 in database 210, portions of the set of security identity information may be deleted or failed to be stored. Some or all of the security attributes may be deleted or failed to be stored. This may allow less data to be stored as part of data blob 220 in database 210 and/or allow these security attributes to be reevaluated when the data blob is reloaded from database to tend to composite application 120. Additionally, some of the identity attributes may also be deleted. However, sufficient identity attributes may be retained such that the corresponding web service client can be identified.

When data blob 220 is transferred from composite application 120 to database 210, this may be referred to as hydrating database 210. When data blob 220 is transferred to database 210, this may free the processing thread previously used to process the data present in data blob 220 to process composite application 120 for other web service clients. When data blob 220 has been loaded to database 210, composite application 120 may continue processing requests for multiple other web service clients. While data blob 220 is stored in database 210, restarts, or other system interruptions, that occurred to any of component applications 121 through 125, composite application 120, and/or the computer system(s) running composite application 120 and component applications 121 through 125 may not affect data blob 220. As such, when data blob 220 is reloaded by composite application 120 from database 210, also referred to as dehydrating database 210, processing may continue as if without effect from the restart or other service interruption. Thus, processing of the composite application may continue where it stopped when data blob 220 was initially stored in database 210, despite a potentially different processing thread being used.

Figure 3:
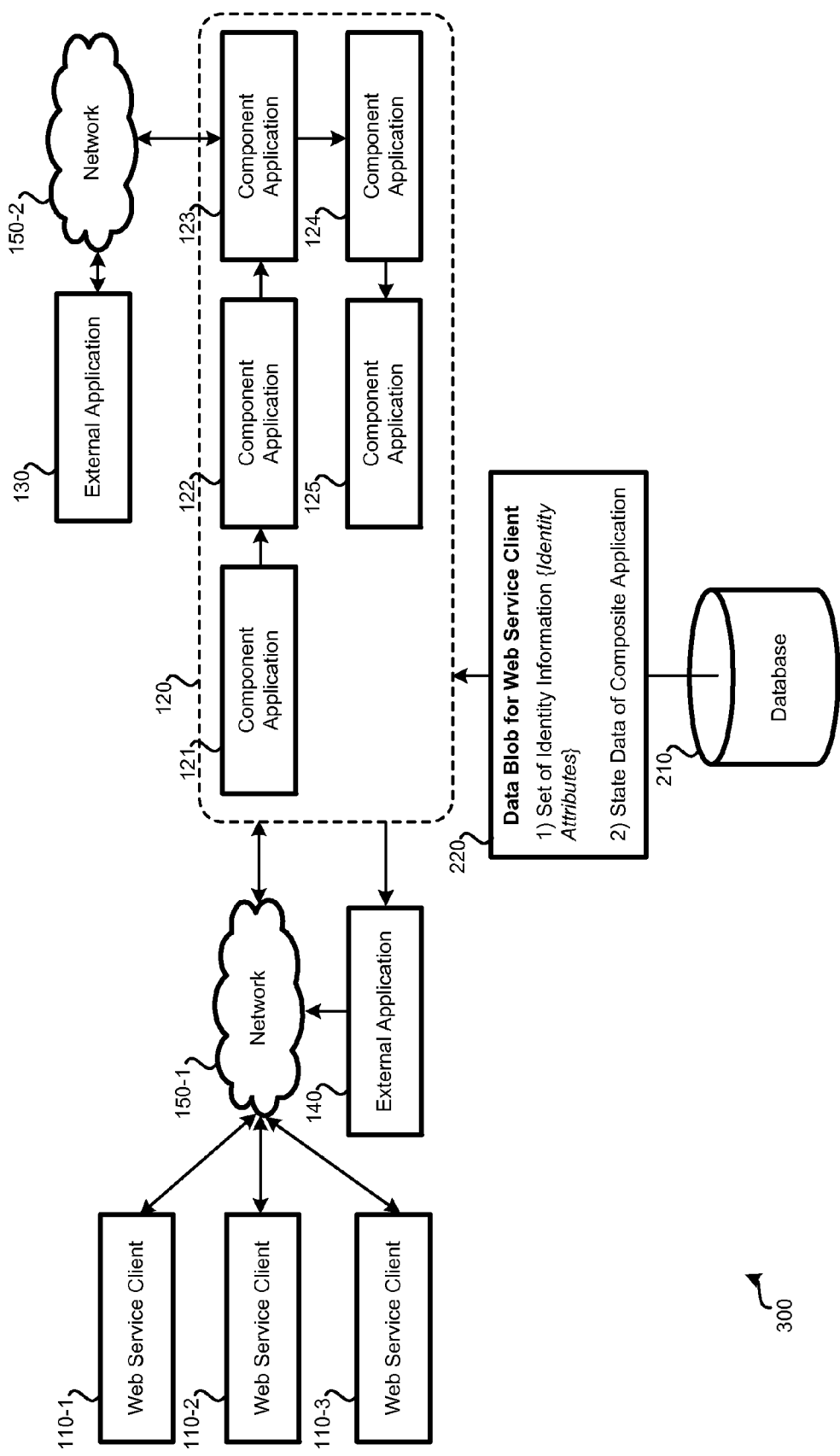
FIG. 3 illustrates an embodiment of a system that includes a composite application dehydrating a database of data linked with a web service client.

FIG. 3 illustrates an embodiment of a system 300 that includes a composite application dehydrating a database of a data blob linked with a web service client, such as web service client 110-1. System 300 may represent the same system as system 100 of FIG. 1 and system 200 of FIG. 2. Upon occurrence of a trigger, data blob 220 may be retrieved from database 210 by composite application 120.

Various triggers may be used to determine when data blob 220 is retrieved from database 210. For example, when a response from an external application, such as external application 130, is received regarding a web service client that has an associated data blob stored in database 210 or following a restart of a component application, the entire composite application, and/or the computer system(s) runs composite application 120. Between when data blob 220 was transferred to database 210 and when a trigger is received to retrieve data blob 220 from database 210, a period of time, such as an hour, a day, or a week, may have elapsed.

After receiving a trigger linked with a web service client, composite application 120 may retrieve the corresponding data blob. This may be referred to as dehydrating database 210 of data blob 220. When retrieved from database 210, data blob 220's set of identity information may contain identity attributes but may not contain security attributes. As such, prior to composite application 120 continuing to process data blob 220 linked with web service client 110-1, the security attributes linked with the web service client may be reevaluated. Based on the identity of the web service client, these security attributes of the set of identity information are reevaluated (the security parameters were initially evaluated when composite application 120 initially began processing a request from web service client 110-1). If no changes have been made, such as by an administrator, to whether that web service client 110-1 should have access to composite application 120, the reevaluation of the security attributes may result in these security attributes being the same as prior to data blob 220 being stored in database 210. Alternatively, if changes have been made to the rights of web service client 110-1, the reevaluation of security attributes may result in the security attributes being different from prior to data blob 220 being stored in database 210.

Based on these security attributes, composite application 120 may evaluate whether the security credentials of web service client 110-1 are sufficient for composite application 120 to continue processing the data blob 220. If the security crystals are sufficient, data blob 220 may be used to reload the state data of the composite application as processed for the web service client. As such, following data blob 220 being loaded by composite application 120, composite application 120 may continue to be processed for web service client 110-1 from where processing ceased prior to data blob 220 being stored in database 210. A different processing thread may be used to process composite application 120 following processing resuming following dehydration of database 210 of data blob 220. This thread may be linked with web service client 110-1 via the set of identity information which may contain identity attributes.

If the security credentials of the web service client are not sufficient, data blob 220 may not be reloaded by composite application 120. As such, the processing of composite application 120 for web service client 110-1 may be abandoned. Web service client 110-1 may receive an indication from composite application 120 stating as such.

Figure 4:
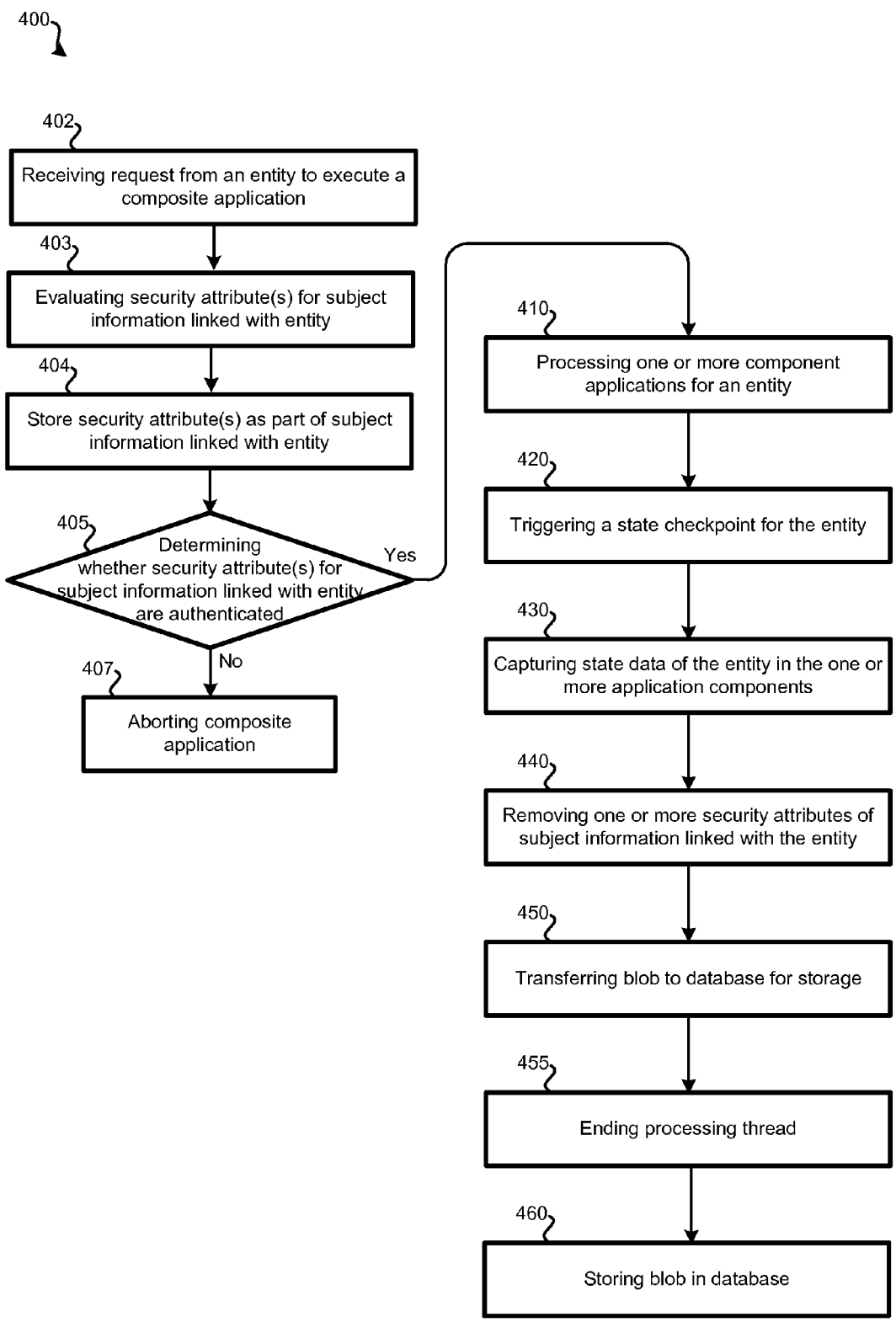
FIG. 4 illustrates an embodiment of a method for hydrating a database with data linked with a web service client and removing associated security attributes.

Systems 100, 200, and 300, of FIGS. 1-3, respectively, can be used to perform various methods for processing composite applications for multiple entities. FIG. 4 illustrates an embodiment of a method for hydrating a database with state data and removing associated security attributes. At block 402, a request may be received from an entity, such as a web service client, that a composite application be executed.

At block 403, one or more of the security attributes for the subject information linked with the entity may be evaluated. Following the one or more security attributes being evaluated, these security attributes may be stored as part of the subject information linked with the entity at block 404.

At block 405, the composite application (or some other application) may determine whether these security attributes of the subject information linked with the entity are authenticated. This may involve comparing the security attributes of the set of subject information linked with the entity to a threshold set of security attributes. If the security attributes of the subject information linked to the entity are not authenticated, processing of the composite application for the entity may be aborted at block 407. If the security attributes are determined to be sufficient, the method may proceed to block 410.

At block 410, the composite application, such as composite application 120 of FIGS. 1-3, may begin to be processed for the entity. While the one or more component applications of the composite application are being processed for the entity by a processing thread, the same and/or other component applications of the composite application may be processed for other entities via other processing threads. Within each thread, identity information may be present that links the processing of the thread to the corresponding entity via identity attributes. This subject object may also contain security attributes linked with the corresponding entity.

At block 420, a checkpoint related to the processing of the composite application for the entity may be triggered. As discussed in relation to system 200, a trigger may be whenever the component application processing the request linked with the web service client changes, whenever a significant amount of time to process a particular component application is expected, such as based on previously observed time periods, whenever a developer has indicated that a checkpoint should occur, on a time-based schedule, such as once per day, before a restart of a component application, the entire composite application; and/or the computer system(s) running composite application occurs. The triggering of the checkpoint at block 420 may occur for only the entity, or may happen for a plurality of the entities that the composite application is being processed for.

At block 430, state data, related to the composite application for the entity, may be captured. State data may be defined as a snapshot of the processing of the composite application for the particular entity. The state data contains the information necessary for a new processing thread to continue processing the composite application for the entity. The state data may include (or be linked with) a set of security identity information linked with the entity. This security identity information may include security identity attributes linked with the entity.

At block 440, some or all of the security attributes of the set of subject information may be removed. As such, some or all of the security attributes linked with the entity may no longer be stored by either composite application 120 or database 210. At block 450, a data blob, containing the state of the composite application as executed for the entity and the identity information is transferred to a database, such as database 210 of FIGS. 2 and 3. Since some or all of the security attributes of the subject information linked with the entity have been deleted or otherwise removed, these security attributes are not stored in the database. While block 450 refers to the data blob being stored in a database, it should be understood that other storage arrangements besides a database may be used. The processing thread for processing the composite application for the entity linked with the data blob may no longer be needed and may be ended at block 455. As such, the resources associated with the processing thread may be allocated for processing the composite application for another entity.

At block 460, the data blob may be stored in the database present on a non-transitory computer-readable storage medium. Due to the fact that a large number of data blobs may be present, and some or all of these data blobs may need to be stored for a relatively long period of time, the database may be maintained on a hard drive, flash memory, or some other form of non-transitory computer-readable storage medium that is nonvolatile.

The blob may remain stored in the database until a request to retrieve the data blob linked to the entity is received.

While at block 440, one or more of the security attributes of the subject information linked with the entity are deleted or otherwise removed, in other embodiments, one or more security attributes may be removed at a different time. For example, rather than removing one or more security attributes before the state data is stored in the database, the one or more security attributes are reevaluated when the state information is retrieved from the database (e.g., the database is dehydrated of the data blob related to the entity). In some embodiments, the security attributes may be stored.

Figure 5:
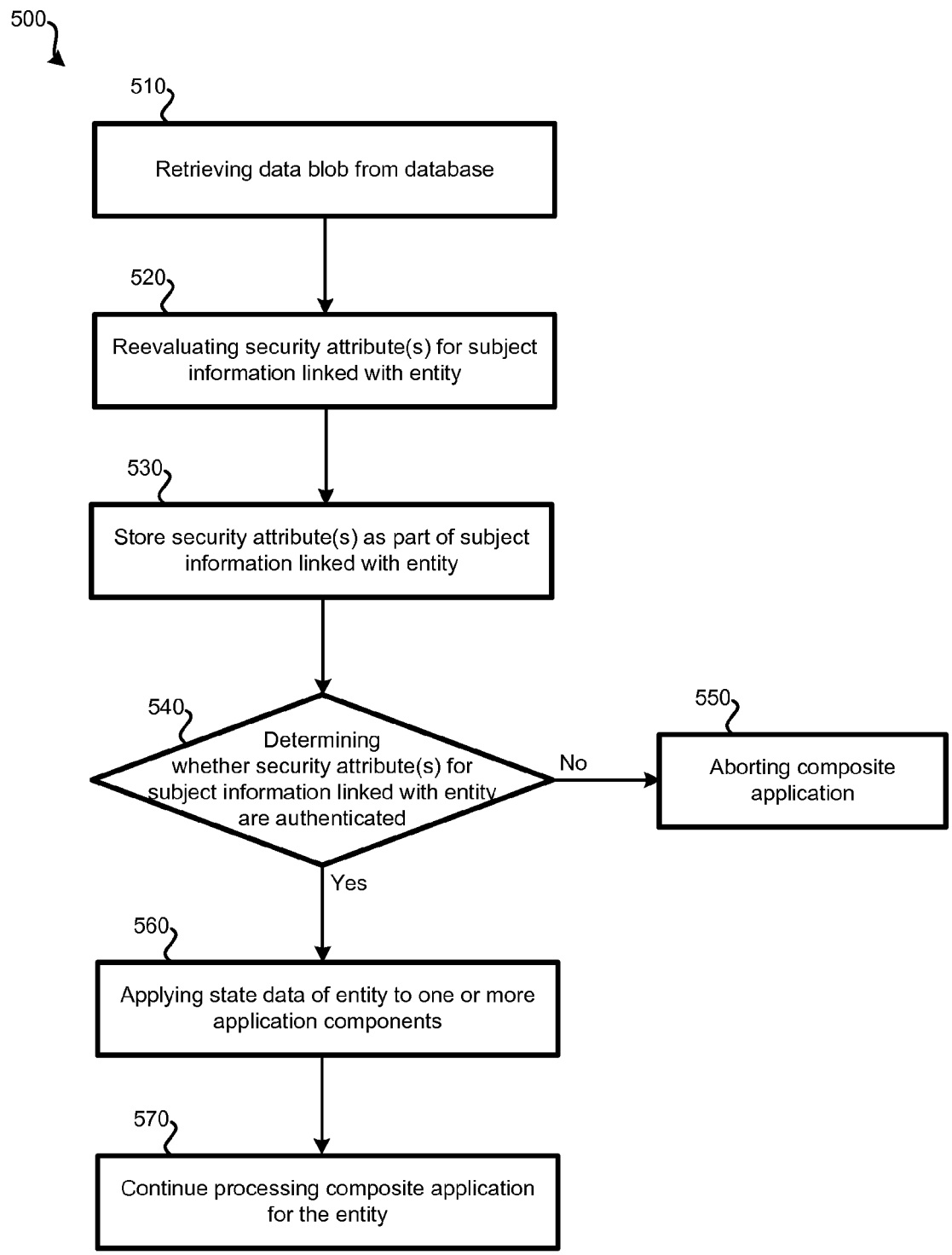
FIG. 5 illustrates an embodiment of a method for dehydrating a database of data linked with a web service client and reevaluating associated security attributes.

While method 400 relates to hydrating a database, method 500 relates to dehydrating a database of a data blob and resuming processing of the composite application for the entity, possibly using a different processing thread of execution. FIG. 5 illustrates an embodiment of a method 500 for dehydrating a database of entity data and determining associated security attributes. At block 510, a data blob linked with the entity, such as the data blob stored in the database at block 460 of method 400, is retrieved. The data blob may be retrieved because a trigger has been received by the composite application that relates to the entity linked with the data blob. A trigger or checkpoint internal to the composite application may also result in the data blob being retrieved. The appropriate data blob may be identified based on the application instance identifier.

While the set of subject information may contain one or more identity attributes of the entity, the security attributes of the set of subject information may not be present, such as because, before the data blob was stored in the database, the security attributes were deleted or otherwise removed. As such, at block 520, one or more of the security attributes for the subject information linked with the entity are reevaluated. Following the one or more security attributes being reevaluated, these security attributes may be stored as part of the subject information linked with the entity at block 530.

At block 540, the composite application may determine whether these security attributes of the subject information linked with the entity are authenticated. This may involve comparing the security attributes of the set of subject information linked with the entity to a threshold set of security attributes. If the security attributes of the subject information linked to the entity are not authenticated, processing of the composite application for the entity may be aborted at block 550.

If the security attributes of the set of subject information linked with the entity are authenticated, method 500 may proceed to block 560. If method 500 proceeds to block 560, this may indicate that the security attributes, as reevaluated at block 520, may have changed; however, the attributes may still be sufficient that the composite application can continue being executed for the entity. At block 560, the state data, such as the state data captured at block 430 of FIG. 4, may be provided to the one or more application components of the composite application from which the state data was previously received. As such, at block 570, a new processing thread can continue processing the composite application for the entity from where processing was left off, such as at block 430 of method 400.

Figure 6:
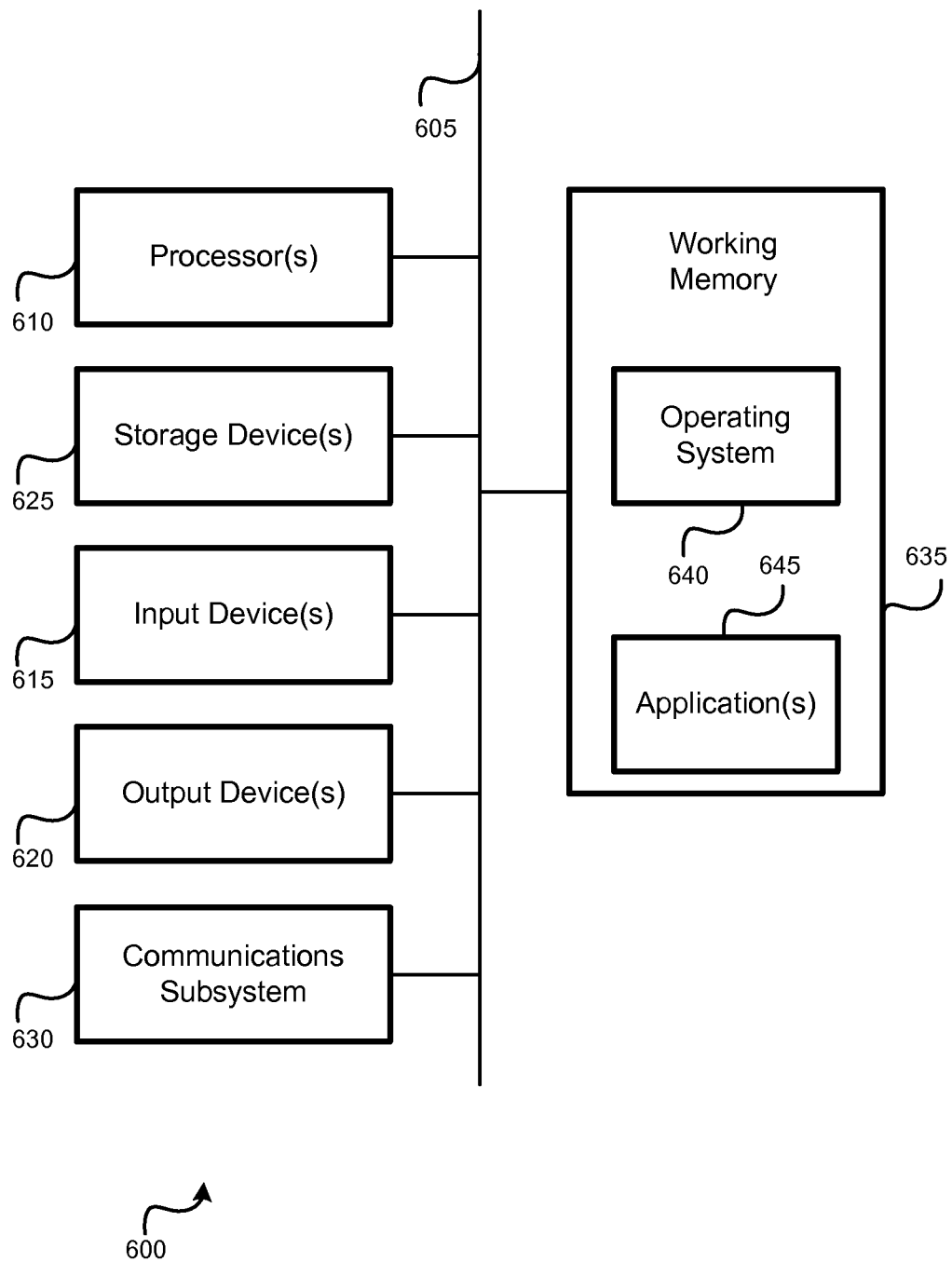
FIG. 6 illustrates an embodiment of a computer system.

FIG. 6 illustrates an embodiment of a computer system. A computer system as illustrated in FIG. 6 may perform the previously described applications. For example, computer system 600 can be used to process a composite application, databases, various component applications, external applications, and/or web service clients. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for handling security for a web service client, the method comprising:

processing, by a web service computer system, using a first processing thread, a first step of an application for the web service client based on a security attribute being valid, wherein:

the web service client is associated with an identity attribute stored by the web service computer system and the security attribute stored by the web service computer system;

the identity attribute identifies the web service client; and the security attribute defines a right of the web service client to access one or more portions of the application;

after processing the first step, transferring, by the web service computer system, state data of the application as processed for the web service client and the identity attribute to a database stored using a non-transitory computer-readable storage medium;

storing the identity attribute and the state data of the application as processed for the web service client to the database, the security attribute not being stored;

after storing the identity attribute and the state data of the application, ending the first processing thread;

in response to a trigger, retrieving the state data of the application as processed for the web service client from the database;

following retrieval of the state data of the application as executed for the entity, reevaluating, by the computer system, the security attribute for the web service client, wherein the security attribute was initially evaluated prior to the first step of the application being processed for the web service client; and processing a second step of the application for the web service client based on the reevaluated security attribute being valid.

2. The method for handling security for the web service client of claim 1, wherein:

processing the first step of the application for the web service client is performed as the first processing thread; and processing the second step of the application for the web service client is performed as a second processing thread.

3. The method for handling security for the web service client of claim 1, further comprising:

removing the security attribute, such that the security attribute is not stored in the database with the identity attribute and the state data of the application as processed for the web service client.

4. The method for handling security for the web service client of claim 1, wherein the application is a composite application functioning as a web service for a plurality of web service client, and the plurality of web service clients includes the web service client.

5. The method for handling security for the web service client of claim 1, wherein storing the state data of the application as processed for the web service client to the database comprises storing the state data as a data blob to the database.

6. The method for handling security for the web service client of claim 1, wherein a value of the security attribute when the first step of the software is performed differs from the value of the security attribute following reevaluation.

7. The method for handling security for the web service client of claim 1, wherein while the identity attribute and the state data of the application as processed for the web service client is stored, at least an hour elapses.

8. The method for handling security for the web service client of claim 7, wherein during at least the hour, the web service computer system is restarted.

9. A web service system for handling security for a web service client, the system comprising:

one or more processors; and a memory communicatively coupled with and readable by the one or more processors and having stored therein processor-readable instructions which, when executed by the one or more processors, cause the one or more processors to:
  process a first step of an application for the web service client, using a first processing thread, based on a security attribute being valid, wherein:
    the web service client is associated with an identity attribute and a security attribute;
    the identity attribute identifies the web service client; and
    the security attribute defines a right of the web service client to access one or more portions of the application;
  after processing the first step, transfer state data of the application as processed for the web service client and the identity attribute to a database stored using a non-transitory computer-readable storage medium;
  store the identity attribute and the state data of the application as processed for the web service client to the database, the security attribute not being stored;
  after storing the identity attribute and the state data of the application, end the first processing thread;
  in response to a trigger, retrieve the state data of the application as processed for the web service client from the database;
  following retrieval of the state data of the application as executed for the entity, reevaluate the security attribute for the web service client, wherein the security attribute was initially evaluated prior to the first step of the application being processed for the web service client; and
  process a second step of the application for the web service client based on the reevaluated security attribute being valid.

10. The web service system for handling security for the web service client of claim 9, wherein the processor-readable instructions are configured such that:
  processing the first step of the application for the web service client is performed as the first processing thread; and
  processing the second step of the application for the web service client is performed as a second processing thread.

11. The web service system for handling security for the web service client of claim 9, wherein the processor-readable instructions, when executed, further cause the one or more processors to:
  remove the security attribute such that the security attribute is not stored in the database with the identity attribute and the state data of the application as processed for the web service client.

12. The web service system for handling security for the web service client of claim 9, wherein the application is a composite application functioning as a web service for a plurality of web service client, and the plurality of web service clients includes the web service client.

13. The web service system for handling security for the web service client of claim 9, wherein the processor-readable instructions that, when executed, cause the one or more processors to store the state data of the application as processed for the web service client to the database comprise processor-readable instructions which, when executed, cause the one or more processors to store the state data as a data blob to the database.

14. The web service system for handling security for the web service client of claim 9, wherein a value of the security attribute when the first step of the software is performed differs from the value of the security attribute following reevaluation.

15. The web service system for handling security for the web service client of claim 9, wherein while the identity attribute and the state data of the application as processed for the web service client is stored, at least an hour elapses.

16. The web service system for handling security for the web service client of claim 15, wherein the web service system is configured to tolerate a restart while the identity attribute and the state data are stored to the database.

17. A non-transitory processor-readable medium for handling security for a web service client, comprising processor-readable instructions configured to cause one or more processors to:
  process a first step of an application, using a first processing thread, for the web service client based on a security attribute being valid, wherein:
    the web service client is associated with an identity attribute stored by the web service computer system and the security attribute stored by the web service computer system;
    the identity attribute identifies the web service client; and
    the security attribute defines a right of the web service client to access one or more portions of the application
  after processing the first step, transfer state data of the application as processed for the web service client and the identity attribute to a database stored using a non-transitory computer-readable storage medium;
  store the identity attribute and the state data of the application as processed for the web service client to the database;
  after storing the identity attribute and the state data of the application, end the first processing thread;
  in response to a trigger, retrieve the state data of the application as processed for the web service client from the database;
  following retrieval of the state data of the application as executed for the entity, reevaluate the security attribute for the web service client, wherein the security attribute was previously evaluated prior to the first step of the application being processed for the web service client; and
  process a second step of the application for the web service client based on the reevaluated security attribute being valid.

18. The non-transitory processor-readable medium for handling security for the web service client of claim 17, wherein the processor-readable instructions are configured such that:
  processing the first step of the application for the web service client is performed as the first processing thread; and
  processing the second step of the application for the web service client is performed as a second processing thread.

* * * * *